United States Patent
Lele

(10) Patent No.: US 7,640,328 B1
(45) Date of Patent: Dec. 29, 2009

(54) METHOD AND APPARATUS FOR PRIORITIZING PROVISIONING DATA IN A PROVISIONING SERVER

(75) Inventor: Abhijeet A. Lele, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 934 days.

(21) Appl. No.: 10/881,881

(22) Filed: Jun. 30, 2004

(51) Int. Cl.
*G06F 15/173* (2006.01)
*G06F 15/16* (2006.01)
*G06F 11/00* (2006.01)

(52) U.S. Cl. .................. 709/223; 709/225; 709/205; 714/4; 714/10

(58) Field of Classification Search .......... None
See application file for complete search history.

(56) References Cited

U.S. PATENT DOCUMENTS

| | | | | |
|---|---|---|---|---|
| 6,728,849 B2 * | 4/2004 | Kodama | ...................... | 711/162 |
| 7,055,053 B2 * | 5/2006 | Saika | ............................. | 714/4 |
| 7,069,267 B2 * | 6/2006 | Spencer, Jr. | .................. | 707/10 |
| 7,191,290 B1 * | 3/2007 | Ackaouy et al. | ............ | 711/119 |
| 7,213,065 B2 * | 5/2007 | Watt | ........................... | 709/223 |
| 7,346,630 B2 * | 3/2008 | Eichstaedt et al. | ....... | 707/104.1 |
| 2003/0051187 A1 * | 3/2003 | Mashayekhi et al. | ........... | 714/4 |

* cited by examiner

*Primary Examiner*—Wen-Tai Lin
(74) *Attorney, Agent, or Firm*—Moser IP Law Group

(57) ABSTRACT

A method and apparatus for prioritizing provisioning data within a provisioning server. The prioritized provisioning data may be used to provision a target server in accordance with the prioritization.

19 Claims, 5 Drawing Sheets

METHOD AND APPARATUS FOR PRIORITIZING PROVISIONING DATA IN A PROVISIONING SERVER

BACKGROUND OF THE INVENTION

1. Field of the Invention

Embodiments of the present invention generally relate to server networks, and more particularly, to a method and apparatus for prioritizing provisioning data within a provisioning server.

2. Description of the Related Art

Modern computer networks generally comprise a plurality of user computers connected to one another and to a computer server via a communications network. To provide redundancy and high availability of information and applications that are executed upon a computer server, multiple computer servers may be arranged in a cluster, i.e., forming a server cluster. Such server clusters are available under the trademark VERITAS CLUSTER SERVER from Veritas Software Corporation of Mountain View, Calif. In a server cluster, a plurality of servers communicate with one another to facilitate failover redundancy such that when software or hardware, i.e., computer resources, become inoperative on one's server, another server can quickly execute the same software that was running on the inoperative server substantially without interruption. As such, a user of services that are supported by a server cluster would not be substantially impacted by an inoperative server or software. To improve the overall effectiveness of the server cluster, specialized provisioning servers can be configured to distribute data, files, and applications (i.e., a "snapshot" of a failed or failing server) to target servers. Once the target server contains the snapshot, the target server operates in the same manner as the failed or failing server and the failed or failing server can be deactivated for repairs or replacement.

As corporations and businesses continue to grow, so are the demands of their respective computer network infrastructures. Directly related to these demands is the overwhelming need for more efficient deployment, operation, and revision of data stored in the servers populating a computer network. Among the numerous files typically stored in a given production server, approximately only 10 percent could be classified as mandatory or essential files that are necessary to initialize operation of a server. Moreover, these essential files are required nearly 90 percent of the time the server is functioning. In contrast, roughly 90 percent of the files stored on a server can be considered nonessential in regard to the initial operation of the server and are only accessed 10 percent of the time during normal operation.

Presently, when a target server requires provisioning, either because it is new or needs to have files reinstalled, the software loading process can prove to be extremely time consuming. This problem can be attributed to the arbitrary distribution of software to the target server. More specifically, the files are randomly provisioned without any consideration to an individual file's importance and functionality. As such, a target server awaits complete provisioning before the target server begins operation.

Therefore, there is a need in the art for a method and apparatus for prioritizing the files stored on a provisioning server and subsequently provisioning these files to a target server in accordance with the prioritization.

SUMMARY OF THE INVENTION

The invention provides a method and apparatus for prioritizing provisioning data within a provisioning server. The term data is used generically to mean computer data, files, applications and any other information stored on a computer or server. The term provisioning data is the data that is to be copied to a target server to enable the target server to be identical to an original server after provisioning is complete, i.e., the target server becomes a clone of the original server. Specifically, this invention operates by prioritizing data contained in a provisioning server and subsequently provisioning the data to a target server in accordance with the prioritization.

In one embodiment of the invention, heuristic information is collected by a provisioning server with regard to the operation of a first target server. This information, which details the functionality of a first target server, may be determined in many ways. In a first example of an illustrative process for collecting the information, the provisioning server executes a file server and a first target server executes a file server client. The file server and client establish links to all the provisioning data. The links are activated to fetch provisioning data (files) from the provisioning server and store them on the first target server. The provisioning server monitors the link activation and creates the heuristic information that details the sequence for installing the provisioning data.

In another illustrative method of collecting heuristic information, the provisioning server copies all provisioning data to a first target server and the first target server is initialized. A filter driver is executed on the first target server to collect heuristic information regarding the executed files and their sequence of execution. This heuristic information is sent to the provisioning server.

No matter how the heuristic information is collected, the heuristic information is used to distinguish primary provisioning data from the nonessential secondary provisioning data. Once the prioritization is complete, further provisioning of other servers is conducted in accordance with the prioritization. The primary provisioning data is provisioned to a second target server first and is subsequently followed by storing of the secondary provisioning data. The secondary data can be stored, as needed, or in the background over an extended period.

In another embodiment of the invention, a user specifies executable files contained in the provisioning data. An image file regarding a production server is created and sent to a provisioning server. The provisioning server inspects the provisioning data at the binary bit level to identify binary dependencies between files. The provisioning server prioritizes the provisioning data according to the binary hierarchical dependencies. Notably, this is accomplished by identifying the shared libraries, shared files, and tree structures of the provisioning data files. Lastly, the provisioning data contents are copied to a target server in accordance with these hierarchical dependencies.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
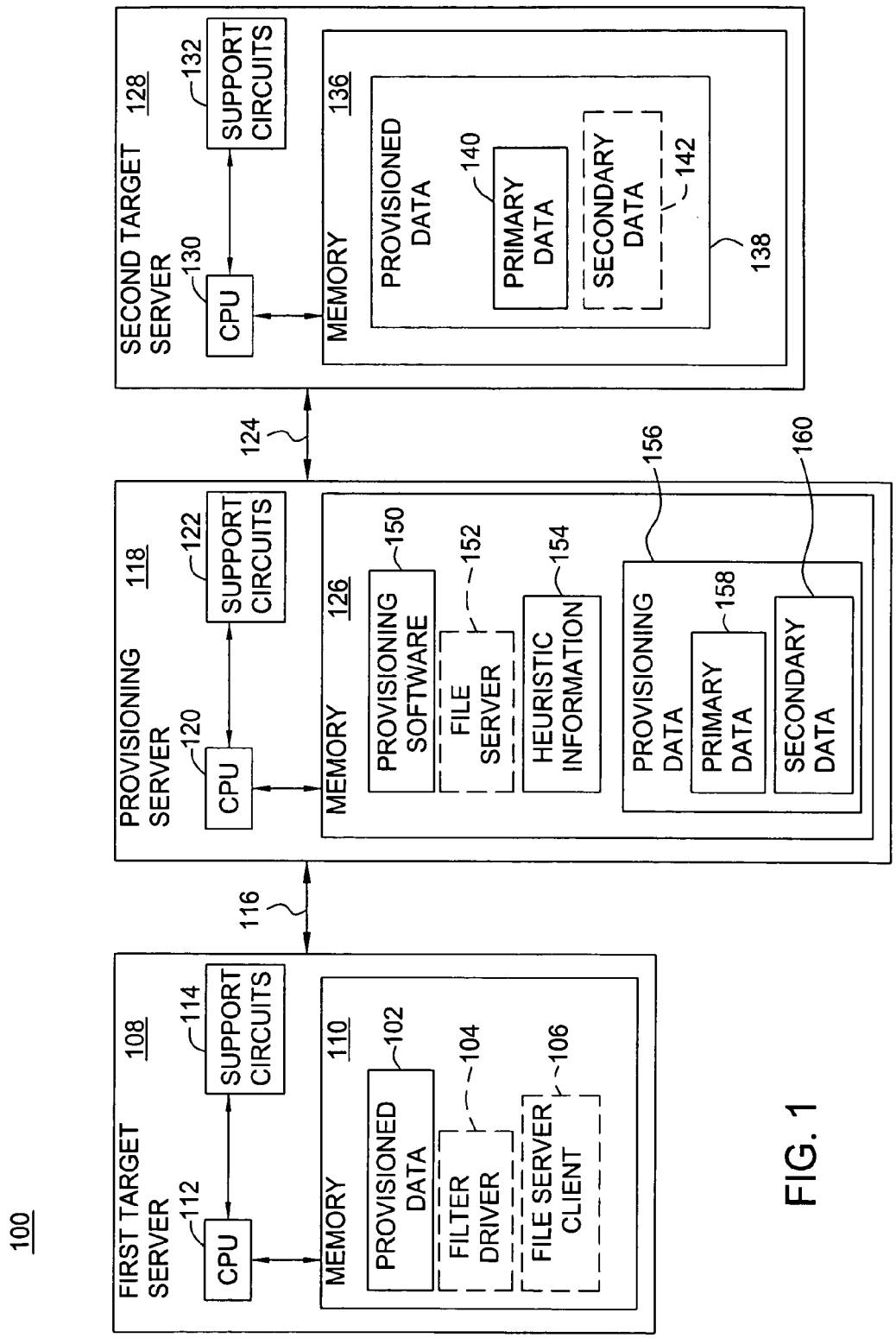
FIG. 1 is a block diagram of a server system that operates in accordance with the present invention.

FIG. 1 depicts a provisioning system 100 in which one embodiment of the present invention may be utilized. The invention, as shall be discussed in detail below, is a method for prioritizing provisioning data within a provisioning server. The term data is used in a generic sense to mean files, computer data, applications and any other information that may reside on a server. The term provisioning data means all the data in a provisioning server that is to be copied (provisioned) to a target server to enable the target server to operate in a manner that is identical to another server, i.e., the data necessary to make a target server a clone of another server.

The provisioning system 100 comprises a provisioning server 118, a first target server 108 and a second target server 128. Such a system 100 is designed to enable the provisioning server 118 to copy provisioning data to a plurality of target servers 108 and 128 to "clone" the servers, e.g., create identical replicas. The provisioning server 118 is coupled to both of the target servers 108 and 128 via network links 116 and 124, e.g., Ethernet, LAN, WAN, fiber channel, and the like. For the sake of simplicity, only one provisioning server 118, and two target server 108 and 128 are depicted in FIG. 1. However, it will be appreciated by those knowledgeable in art that a plurality of provisioning, and target servers can exist in the provisioning system 100.

In one embodiment of the invention (as discussed below with reference to FIGS. 1, 2, 3 and 4), the provisioning server 118 provisions the first target server 108 while information (heuristics) is gathered using various methods to identify the sequence of file utilization within the first target server 108. This heuristic information is used by the provisioning server 118 to prioritize the provisioning data 156 before the provisioning data 156 is to be provisioned to other target servers, e.g., the second target server 128. In another embodiment of the invention (as discussed below with reference to FIGS. 1 and 5), the prioritization of the provisioning data 156 may be performed autonomously within the provisioning server 118 (i.e., without first installing the provisioning data 156 on the first target server 108). After prioritization is complete, the provisioning data 156 may be provisioned to other servers, e.g., second target server 128, in accordance with the prioritization.

Referring to FIG. 1, the provisioning server 118 generally includes at least one central processing unit (CPU) 120, support circuits 122, and memory 126. The CPU 120 may include one or more commercially available processors. The support circuits 122 are well known circuits used for CPU support that include cache, power supplies, clocks, input/output interface circuitry, and the like.

The memory 126 of the provisioning server 118 may include random access memory, read only memory, removable disk memory, flash memory, array storage, and various combinations of these types of memory. The memory 126 of the provisioning server 118 contains provisioning software 150 that is responsible for the functionality of the provisioning server 118 as well as coordinating the necessary provisioning duties. In one embodiment of the invention, the memory 126 also contains special file server software 152 responsible for collecting information regarding provisioning data utilization within the first target server 108. (This file server software 152 is deemed "special" because normal file server software, e.g., network file server (NFS), may be part of the standard installation of software on the provisioning server 118). The information collected by the file server software 152 forms heuristic information 154 that is used to prioritize the provisioning data 156 into primary data 158 and secondary data 160 in accordance with one embodiment of the present invention as discussed below. The primary data 158 (also referred to herein as high priority data) comprises the requisite data (e.g., files, data and applications), that is needed to initialize the target server 128. Likewise, the secondary data 160 consists of data that are nonessential in regard to the server's initial operation and functionality. The invention determines which data is deemed primary and which data is deemed secondary using various processes. Three exemplary processes are described with respect to FIGS. 2, 3, 4 and 5 below. Other processes may also be used to prioritize provisioning data.

The first target server 108 comprises a CPU 112, support circuits 114 and memory 110. The CPU 112 may comprise one or more of the various, readily available processors that are known to those with skill in the art. The support circuits 114 comprise well known circuits including clock circuits, cache, bus circuits, input/output circuits and the like. The memory 110 may be any form of digital storage or combinations of types of storage. The memory 110 comprises provisioned data 102, an optional filter driver 104 and an optional file server client 106. The filter driver 104 and file server client 106 are utilized in support of two different embodiments of the invention described below with respect to FIGS. 2, 3 and 4.

The second target server comprises a CPU 130, support circuits 132 and memory 136. These components are substantially similar to those described above with respect to the first target server 108. The memory 136 stores the provisioned data 138 using the prioritization developed by the provisioning server 118, i.e., primary data 140 is installed and used first, and secondary data 142 is installed subsequently.

Figure 2:
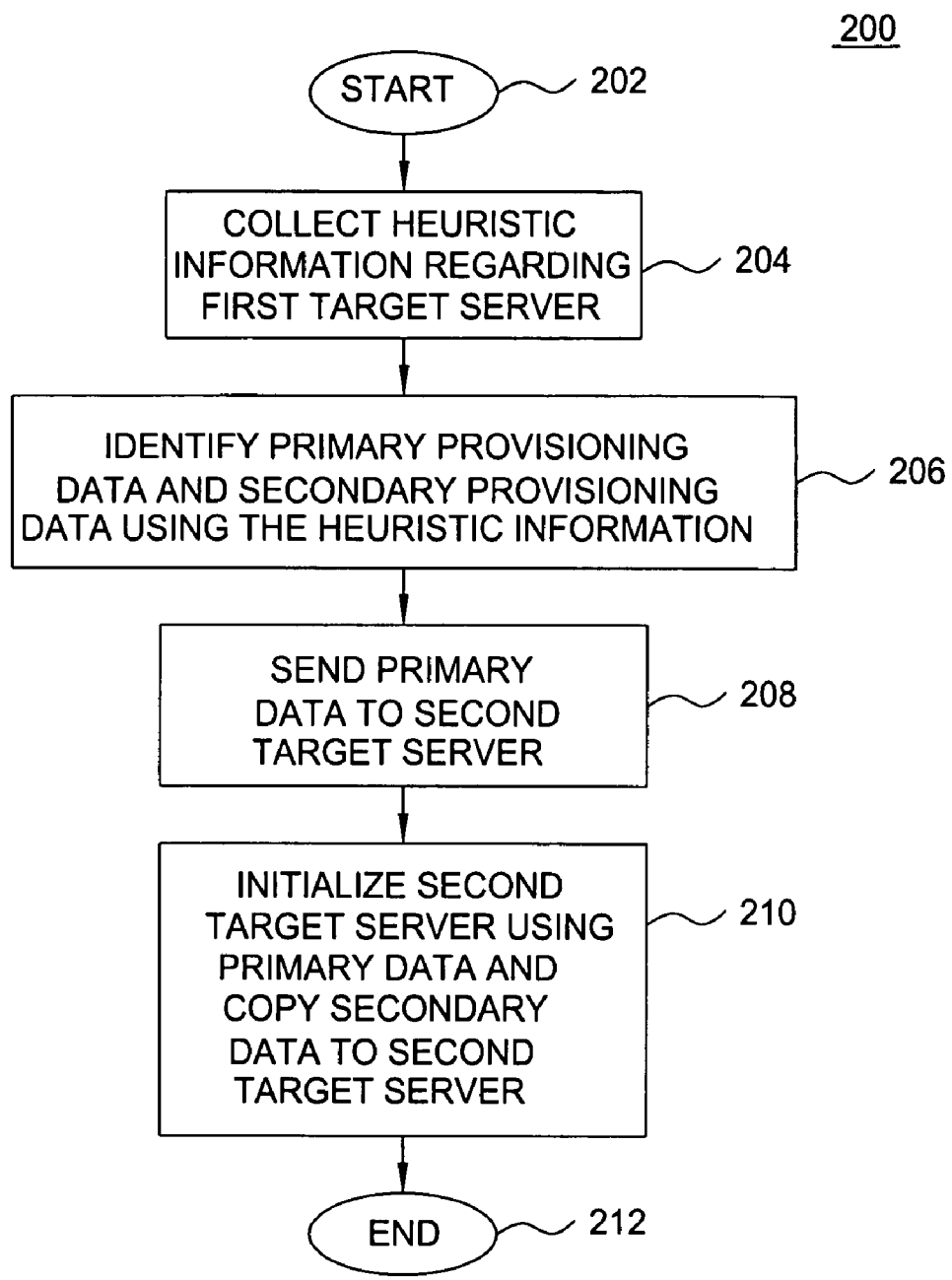
FIG. 2 depicts a flow diagram of a method of prioritizing provisioning data within a provisioning server in accordance with the present invention.

FIG. 2 depicts a flow diagram of one embodiment of a method 200 of prioritizing provisioning data within a provisioning server 118 in accordance with the present invention that uses heuristic information to perform the prioritization. The method 200 depicts an illustrative embodiment of the operation of provisioning software 150 and its interaction with various target servers. The method 200 begins at step 202 and proceeds to step 204, where heuristic information 154 is collected regarding software and files used by the first target server as it is provisioned and operated for the first time, i.e., as the provisioned data 102 is used for the first time. A number of different processes can be used to collect the heuristic information. Two examples of such processes are described with reference to FIGS. 3 and 4 below. For now, it shall be assumed that the heuristic information is available, while specific illustrative methods for collecting the information shall be described below.

More specifically, the heuristic information 154 comprises the active applications, file installation sequence, and use server states and other information relating to the operation (e.g., the boot up process) of the first target server 108. The collected information is used to provide heuristics regarding target server use of the provisional data 102. The provisional data 102 may comprise a snapshot of a server's files, data, applications and states at the particular moment in time. At step 206, the provisioning server 118 uses the first target server's collected information to identify the essential components of the provisional data 102. This information can be used to distinguish primary data 158 from secondary data 160 within the provisioning data 156. In context of this invention, primary data 158 comprises the data (e.g., files, applications, states, data, etc.) that is required to launch and operate a server. Alternatively, secondary data 160 consists of files which are "nonessential" with regard to the server's initial operation and functionality. At step 208, when another server requires provisioning of the provisioning data 156, the identified primary files 158 are sent to and stored in another server, e.g., the second target server 128. The primary data 158 is distributed first so that the second target server 128 will have the requisite files needed to initialize and operate as soon as possible. Since the second target server 128 does not need to have all the data available from the provisioning server to start up, a considerable amount of time is saved using this method 200 of only providing essential data to start the second target server 128 and then providing the secondary data 160, as needed or as a background operation, where the data is provisioned over a period of time. At step 210, the second target server 128 is initialized using the primary data and, after the primary data 158 is provisioned, the secondary data 160 is copied to the second target server 128. To indicate that the secondary data 160 can be stored over time, FIG. 1 depicts the provisioned data 138 as having primary data 140 shown as a solid box and secondary data 142 shown as a dashed box. Once all the data from the provisioning data 156 has been transferred to the target server 128, the method 200 ends at step 212. Additional target servers can be rapidly provisioned in the same manner.

Figure 3:
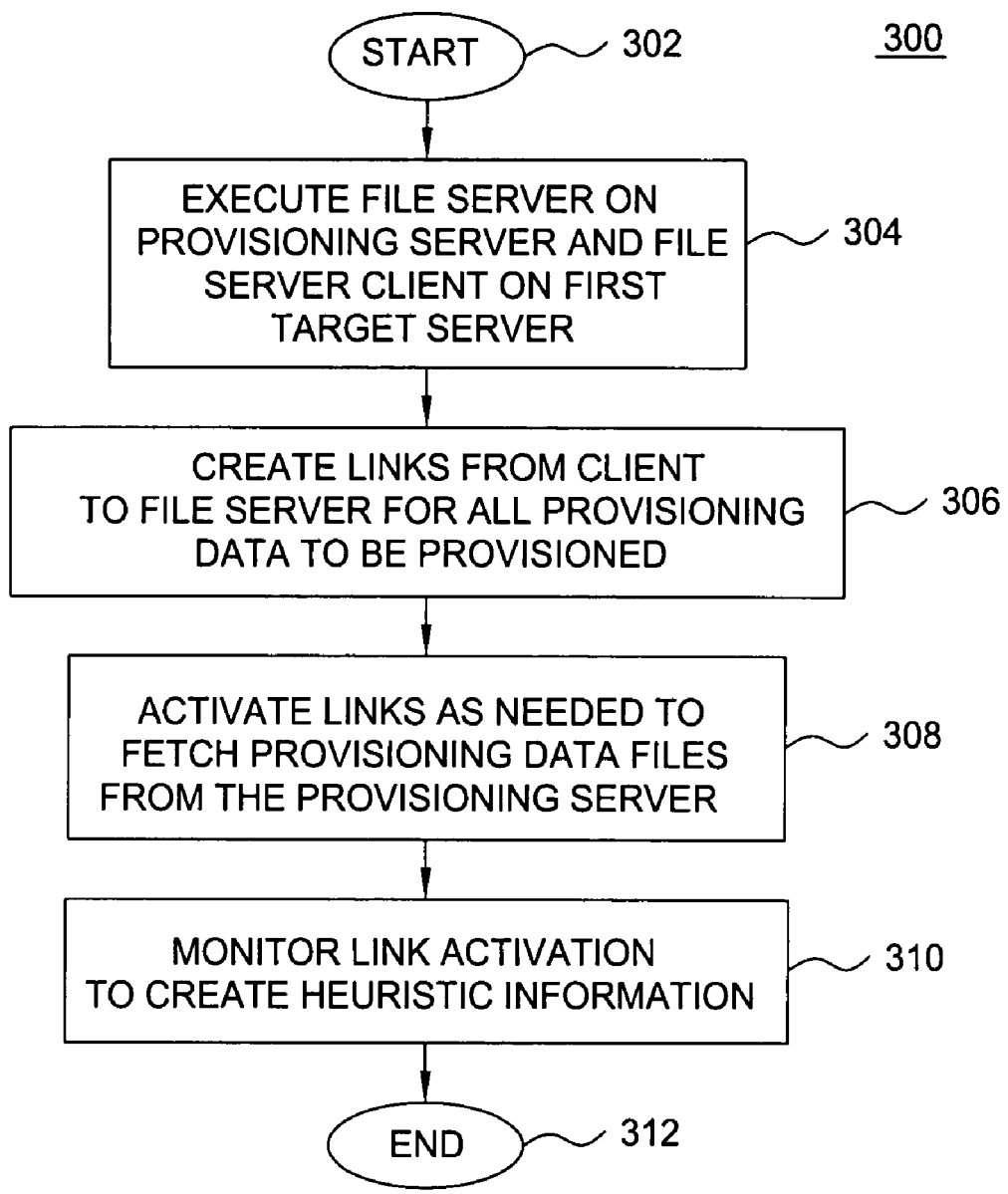
FIG. 3 depicts a flow diagram of a method of collecting heuristic information regarding a target server in accordance with the present invention.

FIG. 3 depicts a flow diagram of an exemplary method 300 of implementing step 204 of FIG. 2 for collecting heuristic information 154 regarding the operation of the first target server 108. The method 300 starts at step 302 and proceeds to step 304, where the provisioning server 118 executes a file server 152 and the first target server 108 executes a file server client 106. The file server 152 and client 106 are shown in phantom in FIG. 1 to emphasize that these elements are components of one optional process for collecting heuristic information 154. At step 306, links are created between the client 106 and file server 152 for all files that are to be provisioned. The actual files in the provisioning data 156 are not yet transferred to the target server 108. At step 308, the links are activated as needed to fetch provisioning data 156 from the provisioning server 118. While the links are being activated, the method 300, at step 310, monitors the activation to create the heuristic information 154 concerning the files and their order of use by the first target server 108. After all the provisioning data 156 is stored as provisioned data 102, the method 300 ends at step 312. The heuristic information 154 is used by method 200 of FIG. 2 as described above.

Figure 4:
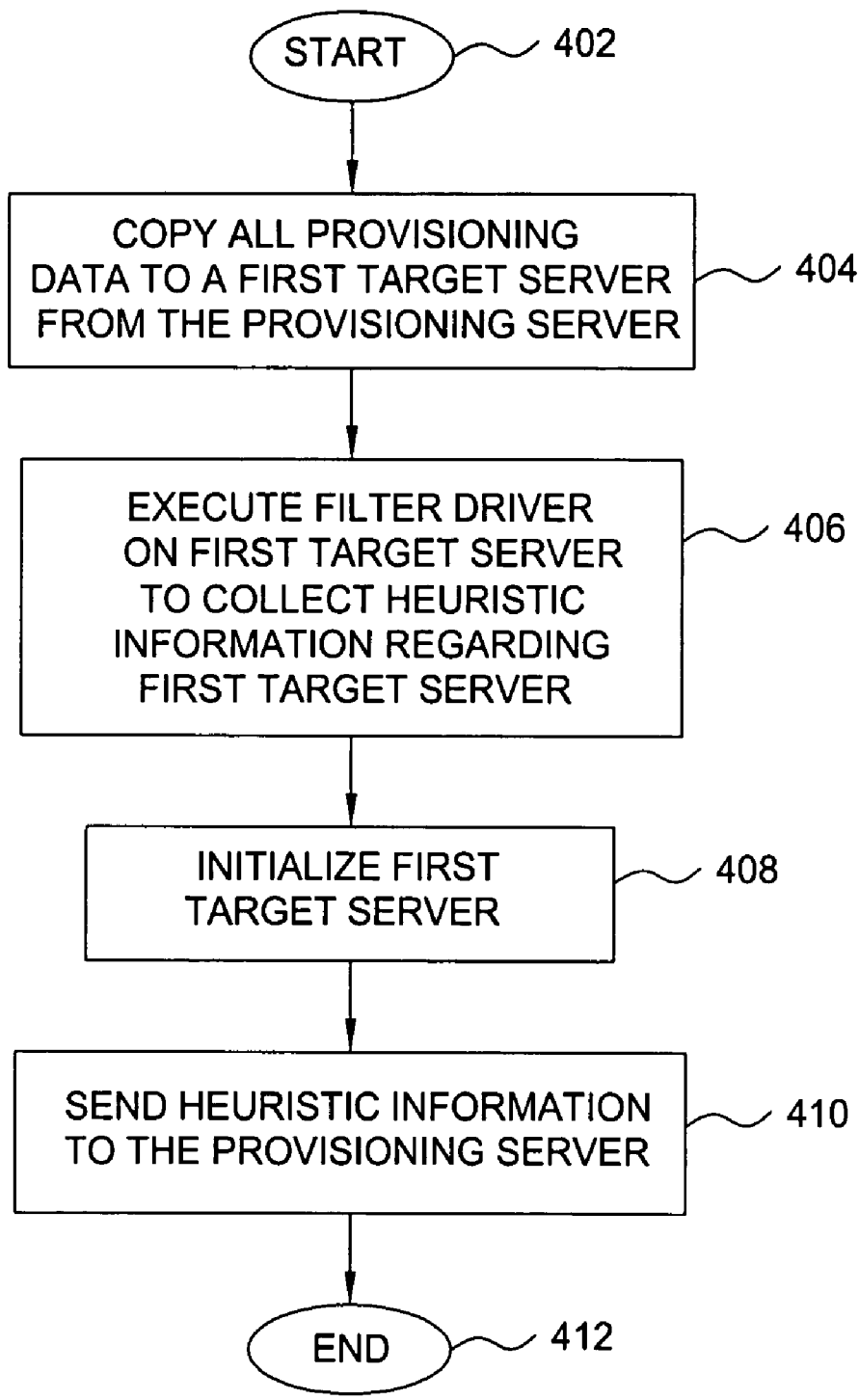
FIG. 4 depicts a flow diagram of an alternative embodiment of a method of collecting heuristic information regarding a target server in accordance with the present invention.

FIG. 4 depicts an alternative method 400 for implementing step 204 of FIG. 2. The method 400 begins at step 402 and proceeds to step 404, where all the provisioning data 156 to be provisioned are copied from the provisioning server 118 to the first target server 108 as provisioned data 102. At step 406, the first target server executes a filter driver 104 to collect heuristic information 154 regarding the first target server 108. Again, a phantom box is used in FIG. 1 to indicate that the use of a filter driver 104 is an optional component of the invention. At step 408, the first target server is initialized. The heuristic information 154 collected during initialization by the filter driver 104 contains a map of the sequence of accesses and file names related to each access to the provisioned data 102. At step 410, the heuristic information 154 is sent to the provisioning server 118 either using an on demand basis or an as needed basis. After the heuristic information 154 is sent to the provisioning server, the method 400 ends at step 412 and the heuristic information 154 is then used in the method of FIG. 2 as described above.

Figure 5:
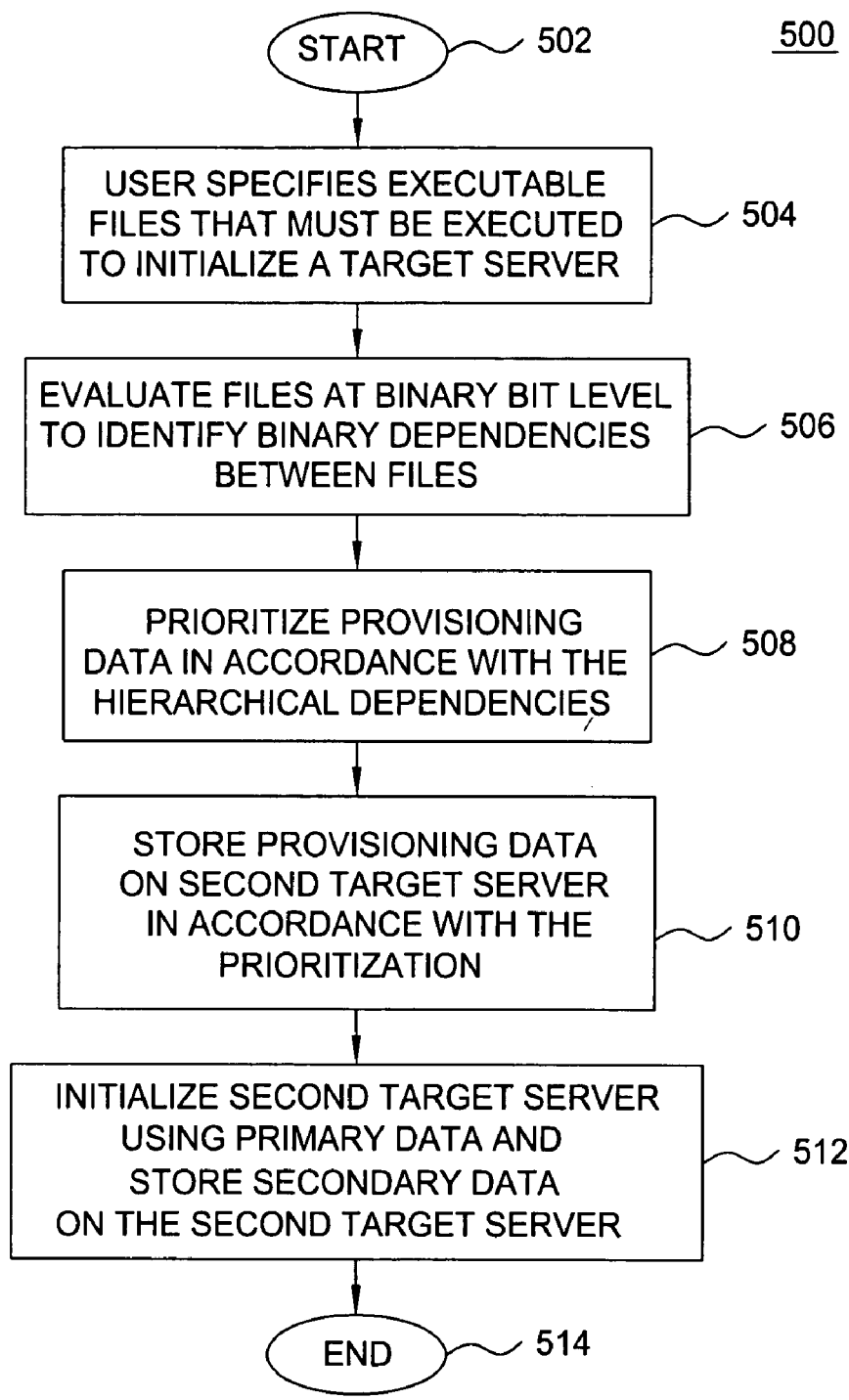
FIG. 5 depicts a flow diagram of a further embodiment of a method of prioritizing provisioning data within a provisioning server in accordance with the present invention.

FIG. 5 depicts a flow diagram of another embodiment of a method 500 of prioritizing provisioning data for a provisioning server 118 in accordance with another embodiment of the present invention. The method 500 illustrates one embodiment of the operation of the provisioning software 150 and its interaction with a target server. In this embodiment, neither the filter driver 104 nor file server 152 are used to collect heuristic information. Specifically, the provisioning server 118 autonomously determines the primary and secondary data 158 and 160 through direct analysis of the provisioning data 156 without using a first target server 108. The method 500 starts at step 502 and proceeds to step 504, where a user, through interaction with the provisioning server 118, specifies executable files that must be executed to initialize a target server. At step 506, the method 500 evaluates the files at a binary bit level to identify binary dependencies between files. The provisioning data 156 contains important binary information that is analyzed to identify data files within their tree structures. Referring to these tree structures is essential since they indicate which files have significant dependencies such as shared libraries, shared files, and the like. For example, in an Unix operating system, an "ldd" command can be used to determine information regarding shared object o and library file dependencies, i.e., dependencies of ".SO" files. Data file dependencies, if any, are generally determined using application specific knowledge or user input. This information, along with any additional information derived from the tree structure of the provisioning data 156, forms heuristic information 154 that provides the provisioning server 118 an indication of the importance of the files.

At step 508, the provisioning server 118 utilizes the information obtained in step 506 and prioritizes the provisioning data 156 in accordance with the file prioritization. At step 510, the prioritized provisioning data is stored on a target server, e.g., the second target server 128. The provisioning data 156 is prioritized in such a fashion so that only the critical files (e.g., primary data 158) are stored first, thus enabling the server 128 to be initialized and start operating as soon as possible. At step 512, the server 128 is initialized and the nonessential remaining files (e.g., secondary data 160) are then stored at the provisioning server's convenience after the essential data are copied. Ultimately, the primary data 158 and secondary data 160 are stored in the target server 128 as provisioned data 138 comprising primary data 140 and secondary data 142. After the target server 128 is provisioned, the method 500 ends at step 514.

The present invention provides a method for prioritizing provisioning data within a provisioning server. Specifically, this invention operates by prioritizing data, files and applications contained in a provisioning server and subsequently provisioning the data to a target server in accordance with the prioritization. This is a significant improvement over the conventional method of launching a server only after all the provisioning data is loaded. Consequently, the present invention fulfills the need in the art for a more time efficient method of provisioning data to a server.

While the foregoing is directed to embodiments of the present invention, other and further embodiments of the invention may be devised without departing from the basic scope thereof, and the scope thereof is determined by the claims that follow.

What is claimed is:

1. A computer-implemented method of provisioning data from one server to another server comprising:
   obtaining, at a provisioning server, provisioning data contained in a production server;
   prioritizing the provisioning data at the provisioning server based on heuristic information obtained during a provisioning of a first target server, wherein the provisioning includes: copying all the provisioning data to the first target server, initializing the first target server with the provisioning data, and executing a filter on the first target server to collect heuristics regarding executed files and an execution sequence of file utilization thereof; and
   provisioning a second target server by transferring said provisioning data to the second target server in accordance with the prioritization;
   wherein the second target server is a clone of the first target server as provisioned with the provisioning data.

2. The method of claim 1, wherein provisioning a second target server comprises:
   assigning a high priority to the provisioning data that is essential to initializing the second target server.

3. The method of claim 1, wherein prioritizing the provisioning data comprises:
   identifying essential components of said provisioning data using said heuristic information to distinguish primary data from secondary data within said provisioning data; and
   wherein provisioning a second target server comprises:
   storing said primary data to said second target server; and
   subsequently storing said secondary data to said second target server.

4. The method of claim 3, further comprising:
   collecting the heuristic information from the first target server; and
   sending the heuristic information to the provisioning server.

5. The method of claim 3, wherein said primary data is data that is essential for initializing said first and second target servers.

6. The method of claim 4, wherein collecting the heuristic information from the first target server comprises:
   executing a file server on said provisioning server;
   executing a file server client on said first target server;
   establishing at least one link to provisioning data within said provisioning server;
   activating said at least one link to provision said first target server with said provisioning data; and
   monitoring the link activation to form the heuristic information.

7. The method of claim 1, wherein prioritizing the provisioning data comprises:
   specifying executable files within said provisioning data;
   inspecting said provisioning data at a binary bit level; and
   prioritizing contents of said provisioning data in accordance to binary hierarchical dependencies.

8. The method of claim 7, wherein said contents of said provisioning data are designated as at least one of primary data or secondary data.

9. The method of claim 8, wherein said primary data is data that is essential for initializing said target server.

10. An apparatus for provisioning data from one server to another server comprising:
    a provisioning server operable to (i) obtain provisioning data contained in a production server, (ii) prioritize said provisioning data based on heuristic information obtained during a provisioning of a first target server, wherein the provisioning includes: copying all the provisioning data to the first target server, the first target server being initialized with the provisioning data, and the first target server having a filter executed thereon to collect heuristics regarding executed files and an execution sequence of file utilization thereof; and (iii) transfer said provisioning data to a second target server in accordance with the prioritization;
    wherein the second target server is a clone of the first target server as provisioned with the provisioning data.

11. The apparatus of claim 10, further comprising: the second target server, wherein said second target server is operable to (i) obtain the provisioning data and (ii) undergo provisioning in accordance with the prioritization.

12. The apparatus of claim 10, wherein said provisioning server is further operable to prioritize said provisioning data into primary data and secondary data.

13. The apparatus of claim 12, wherein said primary data comprises data that is essential to initializing an operation of a target server.

14. The apparatus of claim 10, wherein said provisioning server comprises:
    provisioning software that, when executed, interacts with said first target server to collect heuristic information regarding provisioning of said first target server with provisioning data, and using said heuristic information to prioritize said provisioning data to form prioritized provisioning data.

15. The apparatus of claim 14, further comprising: said first target server, wherein said first target server is provisioned using said provisioning data.

16. A provisioning server having provisioning software executing thereon, comprising:
    means for obtaining provisioning data contained in a production server;
    means for prioritizing the provisioning data based on heuristic information obtained during a provisioning of a first target server, wherein the provisioning includes: copying all the provisioning data to the first target server, initializing the first target server with the provisioning data, and executing a filter on the first target server to collect heuristics regarding executed files and an execution sequence of file utilization thereof; and
    means for provisioning a second target server with the provisioning data in accordance with the prioritization;
    wherein the second target server is a clone of the first target server as provisioned with the provisioning data.

17. The provisioning server of claim 16, wherein said prioritizing means prioritizes the provisioning data into primary data and secondary data.

18. The provisioning server of claim 17, wherein said primary data comprises data that is essential to initializing an operation of said second target server.

19. The provisioning server of claim 16, wherein said prioritizing means further comprises:

means for collecting heuristic information regarding provisioning said first target server with provisioning data; and means for using said heuristic information to prioritize said provisioning data to form prioritized provisioning data.

* * * * *